(Model.)
W. H. SMITH.
Car Wheel.
No. 239,991.  Patented April 12, 1881.
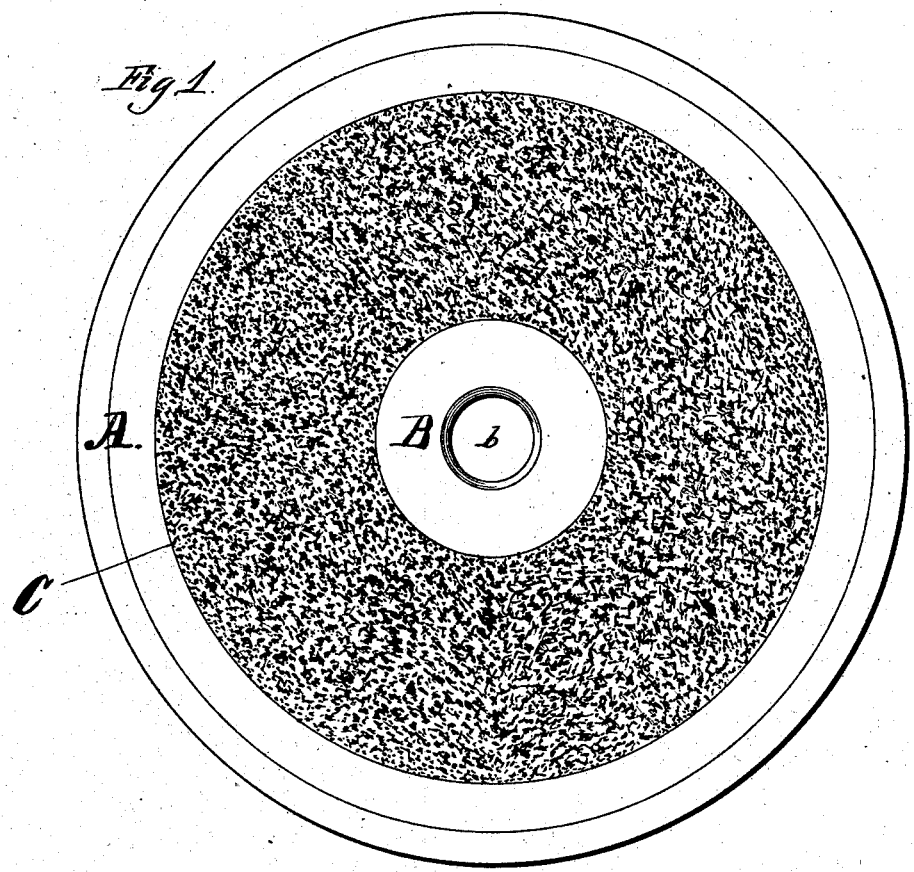
WITNESSES—
F. B. Townsend
H. W. M. Munday
INVENTOR—
Wm Harrold Smith
by Munday Evans & Adcock
his Attorneys.

UNITED STATES PATENT OFFICE.

WILLIAM HARROLD SMITH, OF CHICAGO, ILLINOIS, ASSIGNOR OF FIFTY-TWO ONE-HUNDREDTHS TO JAMES LAWRENCE HOUGHTELING AND FIFTEEN ONE-HUNDREDTHS TO JOHN LANDER, OF SAME PLACE.

CAR-WHEEL.

SPECIFICATION forming part of Letters Patent No. 239,991, dated April 12, 1881.

Application filed September 3, 1880. (Model.)

To all whom it may concern:

Be it known that I, WILLIAM HARROLD SMITH, of Chicago, in the county of Cook and State of Illinois, have invented certain new and useful Improvements in Car-Wheels, of which the following is a specification.

My invention relates more particularly to improvements in that class of wheels wherein a metallic rim and hub is employed in connection with some slightly elastic material of which the body of the wheel is made; and my invention consists in making the annular body of the car-wheel of compressed solidified sawdust, finely-comminuted wood particles, pulp, or other like material, in connection with the grooved or scalloped rim and hub between and by which the annular body of the wheel is secured or bound.

It also consists in the process by which the annular body of the wheel is made and united or combined with the rim and hub, and in using the annular space between the rim and the hub as a mold, into which the material forming the annular body of the wheel is compressed and shaped.

In the accompanying drawings, which form a part of this specification, Figure 1 is a plan view of a wheel embodying my invention, and Fig. 2 is a diametrical section of the same.

In said drawings similar letters of reference refer to like parts wherever used.

A represents the metallic rim of the wheel, the outer periphery of which is made of the usual shape of the rim of a car-wheel, and its inner periphery is scalloped out or made concave, as shown at $a$. B is the metallic hub of the wheel, provided with the ordinary hole, $b$, for the insertion of the car-axle. The outer periphery of the hub B is scalloped out or made concave, as shown at $b'$, similar to the inner periphery of the rim A.

C is the annular slightly elastic body of the wheel, which fits in and fills the annular space between the rim and the hub, and which is made of compressed solidified sawdust, finely-comminuted wood particles, wood or vegetable pulp, or other like material, in the manner hereinafter described.

By reason of the inner surface of the rim and the outer surface of the hub both being made concave, the annular body of the wheel is grasped between the two, and the three parts of the wheel—rim, body, and hub—are thus firmly and securely united together, and a bearing given both to the rim and hub against the body of the wheel, to resist a transverse thrust or force, and thus prevent either the rim being loosened or shoved off of the wheel or the hub being pushed out transversely, and I am thus enabled to dispense with the side plates and central segmental plate usually employed in paper car-wheels. However, in connection with my invention, side plates may be used, if desired; but the compressed solidified material of which the body of the wheel is made has such strength and tenacity, and is so adapted to resist a transverse thrust, that side plates may be dispensed with.

The process of making my improved wheel is as follows: I have discovered that wood or vegetable pulp, finely-comminuted wood particles, sawdust, or such like material, may be formed into solid blocks of almost any degree of solidity, density, strength, and tenacity by taking such material in a dry state, first heating it, and then subjecting it to impact in molds from the blows of a powerful steam-hammer.

In the manufacture of my improved car-wheels I place the rim of the wheel in the bottom of the mold, which should be of such size as to fit flush with the inner edge of the rim, and with its bottom so shaped as to surround and conform to shape of the rim, so as to prevent any expansion of the rim under the pressure of the material forming the body of the wheel, and the hub is secured in the center of the wheel. This can best be done by means of a pin projecting up from the bottom of the anvil or plate through the axle-hole in the center of the hub. An annular mold and die is employed to conform to the interior diameter of the rim and the exterior diameter of the hub. The material of which the body of the wheel is to be made is heated in a dry state to from 200° to 400° Fahrenheit, depending somewhat upon the kind of material used, and the greater heat employed the better results will be produced, provided the material is not injured thereby, and a sufficient quantity of the hot material being placed in the annular mold to form a wheel, it is then subjected to impact from numerous blows of a powerful steam-hammer, until the requisite degree of solidity and strength is produced. The annular body of the wheel being thus at the same time shaped, solidified, and compressed into the space between the hub and rim, the three parts are also at the same time most securely united together. The metallic rim of the wheel at the time of the compression should also be heated, but not so hot as to burn or injure the material of which the body of the wheel is being formed, so that by contraction, when the same becomes cool, it will more firmly bind the body of the wheel.

At or before the time of heating the material of which the body of the wheel is made, various adhesive matters—such as glue and resin—and various preservative substances—such as lime—all, however, in a dry, powdered state, may be added thereto.

In making wheels of sawdust, I mix therewith about five per cent. of resin, about one per cent. of glue, and about five per cent. of lime, and the same produces a very strong and substantial wheel.

The outer periphery of the hub may be convoluted or made irregular in shape, as it is not essential that it be made circular, and as the body of the wheel can be made to conform to any shape of hub or rim.

My invention may also be employed in pulleys and various other wheels than car-wheels.

What I claim is—

1. The car-wheel consisting of a concave or scalloped metallic rim and hub and an annular body fitting and filling the space between the rim and hub, made of compressed and solidified vegetable material, substantially as specified.

2. The wheel consisting of a metallic rim and hub and an annular body made of compressed and solidified vegetable material, the three parts of the wheel being united together by having the edges or faces of the annular body made either concave or convex and the rim and hub shaped to conform thereto, substantially as and for the purpose specified.

3. The car-wheel consisting of a concaved or grooved metallic rim and hub and an annular body fitting and filling the space between the rim and hub, made of compressed and solidified vegetable material, substantially as specified, and containing an admixture of adhesive or cementing and wood-preserving substances, substantially as and for the purpose specified.

4. The above-described process of making elastic car-wheels and other wheels, consisting in filling, compressing, and solidifying the material which forms the annular body of the wheel into the space between the hub and the rim—that is to say, by first heating the said material in a dry state, and then compressing and solidifying the same while hot, by subjecting it to impact in a mold which closes the annular space between the rim and hub, substantially as and for the purpose specified.

5. The process of making elastic car-wheels and other wheels, consisting in solidifying and compressing the material forming the annular body of the wheel, in a dry hot state, into the space between the rim and hub as a mold, the rim being expanded by heat at the time of such compression, so that the subsequent contraction of the rim will act in conjunction with the previous compression in uniting and binding the three parts of the wheel together, substantially as specified.

W. HARROLD SMITH.

Witnesses:
 EDMUND ADCOCK,
 JOHN W. MUNDAY.